United States Patent
Luo

(10) Patent No.: US 7,286,318 B1
(45) Date of Patent: Oct. 23, 2007

(54) OPTIMIZATION OF POSITION MODE SEEKING OF A DISK DRIVE HEAD BASED ON MEASURED OPEN LOOP ACTUATOR RESPONSE

(75) Inventor: Jihao Luo, Shrewsbury, MA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 11/454,526

(22) Filed: Jun. 16, 2006

Related U.S. Application Data

(60) Provisional application No. 60/759,766, filed on Jan. 18, 2006.

(51) Int. Cl.
  *G11B 5/596* (2006.01)
(52) U.S. Cl. .................................. 360/78.09
(58) Field of Classification Search ............. 360/78.09, 360/75, 77.04, 77.05, 77.11, 78.01, 78.04, 360/78.14, 77.02, 77.07, 78.05, 44.28, 124.1; 318/568.1
See application file for complete search history.

(56) References Cited

U.S. PATENT DOCUMENTS

| | | | | |
|---|---|---|---|---|
| 5,161,140 A | * | 11/1992 | Terada | 369/44.28 |
| 5,742,145 A | * | 4/1998 | Khorrami et al. | 318/632 |
| 5,880,953 A | * | 3/1999 | Takeuchi et al. | 700/30 |
| 5,920,441 A | * | 7/1999 | Cunningham et al. | 360/78.05 |
| 6,005,742 A | * | 12/1999 | Cunningham et al. | 360/78.05 |
| 6,316,899 B1 | * | 11/2001 | Rastegar et al. | 318/568.1 |
| 6,831,804 B2 | * | 12/2004 | Ooi et al. | 360/77.07 |
| 7,042,827 B2 | * | 5/2006 | Cho et al. | 369/124.1 |
| 2004/0246618 A1 | * | 12/2004 | Ehrlich | 360/77.02 |

* cited by examiner

*Primary Examiner*—Fred F. Tzeng
(74) *Attorney, Agent, or Firm*—Myers Bigel Sibley & Sajovec, P.A.

(57) ABSTRACT

A disk drive and related methods are provided for tuning the control of an actuator for position mode seeking of a head between tracks on a disk based on a measured open loop response of the actuator. The disk drive includes a rotatable data storage disk, a head, an actuator, and a servo controller. The actuator positions the head relative to the disk responsive to a current command signal. The servo controller carries out a position mode seek of the head between tracks on the disk by generating the current command signal which is varied in response to a current feedforward signal that defines a head position profile during the seek, varied in response to a position response signal that defines an expected actuator movement response of the head to the current feedforward signal, and varied in response to a current feedback signal. The servo controller measures an open loop response of the actuator to an open loop test current signal, and uses the measured position mode seek performance to vary contributions of the current feedforward signal and the position response signal to the current command signal to improve the position mode seek performance.

24 Claims, 5 Drawing Sheets

OPTIMIZATION OF POSITION MODE SEEKING OF A DISK DRIVE HEAD BASED ON MEASURED OPEN LOOP ACTUATOR RESPONSE

RELATED APPLICATION

This application claims the benefit of and priority to U.S. Provisional Patent Application Ser. No. 60/759,766, filed Jan. 18, 2006, the disclosure of which is hereby incorporated herein by reference as if set forth in its entirety.

FIELD OF THE INVENTION

The present invention generally relates to digital data storage devices and, more particularly, to a disk drive that seeks a head between tracks on a disk in the disk drive and related methods.

BACKGROUND OF THE INVENTION

Disk drives are digital data storage devices which can enable users of computer systems to store and retrieve large amounts of data in a fast and efficient manner. A typical disk drive includes a plurality of magnetic recording disks which are mounted to a rotatable hub of a spindle motor and rotated at a high speed. An array of read/write heads is disposed adjacent surfaces of the disks to transfer data between the disks and a host computer. The heads can be radially positioned over the disks by a rotary actuator and a closed loop, digital servo system, and can fly proximate the surfaces of the disks upon air bearings.

A plurality of nominally concentric tracks can be defined on each disk surface. A preamp and driver circuit generates write currents that are used by the head to selectively magnetize areas of the tracks during a data write operation and amplifies read signals detected by the head during a data read operation. A read/write channel and interface circuit are connected to the preamp and driver circuit to transfer the data between the disks and the host computer.

The servo system can operate in two primary modes: seeking and track following. During a seek, a selected head is moved from an initial track to a target track on the corresponding disk surface. The servo system applies a current command signal to an actuator coil to accelerate the head toward the target track. During the seek, the servo system can measure the location of the head as it moves across the disk based on servo data that is recorded on the disk, and can adjust the current command signal in response to the location measurements. As the head approaches the target track, the servo system decelerates the head to bring it to rest over the target track. Thereafter, the servo system enters the track following mode wherein the head is maintained over the center of the target track while data is written/read. The seek operation may be carried out as either velocity based or position based seek. A position mode seek is controlled via a pre-defined position profile using both feedforward and feedback techniques.

As will be appreciated, a disk drive is primarily utilized to transfer data between the disk tracks and the host computer. Such data transfer operations usually cannot occur during a seek, but rather require the servo system to be in track following mode. Hence, to maximize disk drive data transfer rate capabilities, disk drives can attempt to minimize their average seek times while satisfying other constraints on disk drive operation, such as noise and/or vibration constraints. However, a servo system that may be optimized based on the expected characteristics of a family of disk drives may not adequately compensate for differences in the characteristics between individual disk drives within that family. Moreover, over time disk drive characteristics can further vary due to, for example, mechanical wear, altitude variations, and power supply voltage variations. Accordingly, a servo system that is designed to provide minimum average seek times for a family of disk drives may not provide acceptable performance for at least some disk drives in the family.

SUMMARY OF EMBODIMENTS OF THE INVENTION

A disk drive and related methods are provided for tuning the control of an actuator for position mode seeking of a head between tracks on a disk based on a measured open loop response of the actuator. The disk drive includes a rotatable data storage disk, a head, an actuator, and a servo controller. The actuator positions the head relative to the disk responsive to a current command signal. The servo controller carries out a position mode seek of the head between tracks on the disk by generating the current command signal which is varied in response to a current feedforward signal that defines a head position profile during the seek, varied in response to a position response signal that defines an expected actuator movement response of the head to the current feedforward signal, and varied in response to a current feedback signal. The servo controller measures an open loop response of the actuator to an open loop test current signal, and uses the measured open loop response to vary contributions of the current feedforward signal and the position response signal to the current command signal for the position mode seek of the head.

In some further embodiments of the present invention, the contributions of the current feedforward signal and the position response signal to the current command signal for the position mode seek of the head can be iteratively adjusted until the position mode seek performance of the actuator satisfies one or more threshold values.

Accordingly, the position mode seek operations carried out by the disk drive can be optimized based on the particular open loop response characteristics of the actuator, and may be adjusted over time to compensate for variations in the seek characteristic that may occur in the disk drive due to, for example, mechanical wear, altitude variations, and/or power supply voltage variations.

DETAILED DESCRIPTION OF EMBODIMENTS OF THE INVENTION

Figure 1:
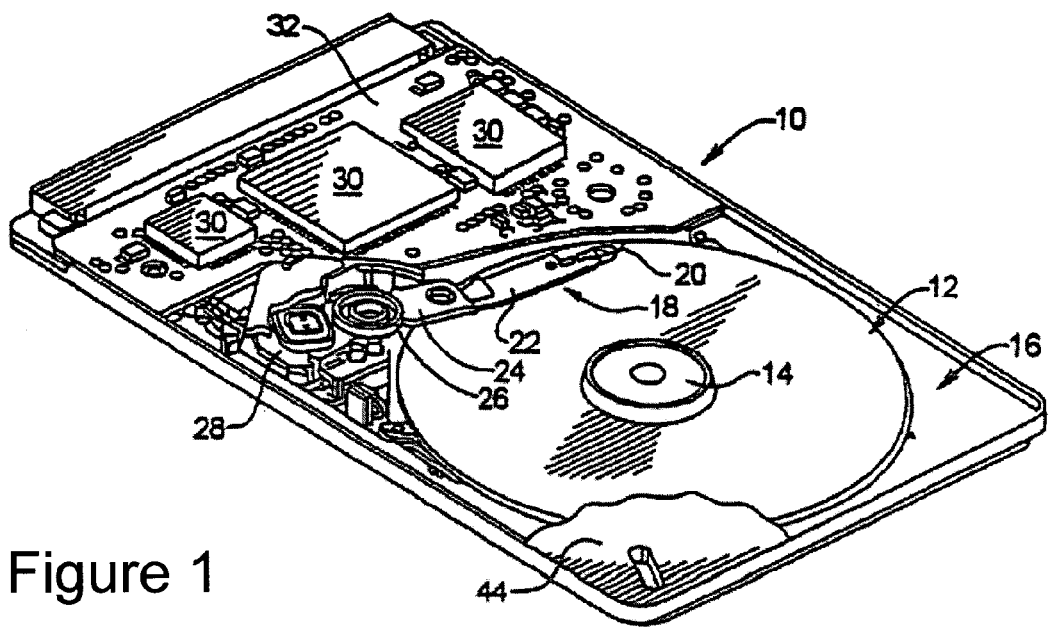
FIG. 1 is a perspective view of a disk drive with electronic circuits that are configured in accordance with some embodiments of the present invention.

The present invention now will be described more fully hereinafter with reference to the accompanying drawings, in which embodiments of the invention are shown. However, this invention is not to be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size, relative sizes, and orientation of elements may be exaggerated for clarity. It will be understood that, although the terms first, second, etc. may be used herein to describe various elements and/or signals, these elements and/or signals should not be limited by these terms. These terms are only used to distinguish one element/signal from another element/signal. Thus, a first element/signal discussed below could be termed a second element/signal without departing from the teachings of the present invention.

Some embodiments of the present invention may be embodied in hardware and/or in software (including firmware, resident software, micro-code, etc.). Consequently, as used herein, the term "signal" may take the form of a continuous waveform and/or discrete value(s), such as digital value(s) in a memory or register. Furthermore, the present invention may take the form of a computer program product on a computer-usable or computer-readable storage medium having computer-usable or computer-readable program code embodied in the medium for use by or in connection with an instruction execution system.

Various embodiments of the present invention are described below with reference to block diagrams of disk drives, disks, controllers, and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

A simplified diagrammatic representation of a disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and retrieve data in the disk drive 10.

The actuator 18 includes a head 20 (or transducer) mounted to a flexure arm 22 which is attached to an actuator arm 24 that can rotate about a pivot bearing assembly 26. The head 20 may, for example, include a magnetoresistive (MR) element and/or a thin film inductive (TFI) element. The actuator 18 also includes a voice coil motor (VCM) 28, or other solenoid/motor, which moves the head 20 relative to the disk stack 12. The spindle motor 14 and actuator 18 are coupled to a controller, read/write channel circuits, and other associated electronic circuits 30 which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Figure 2:
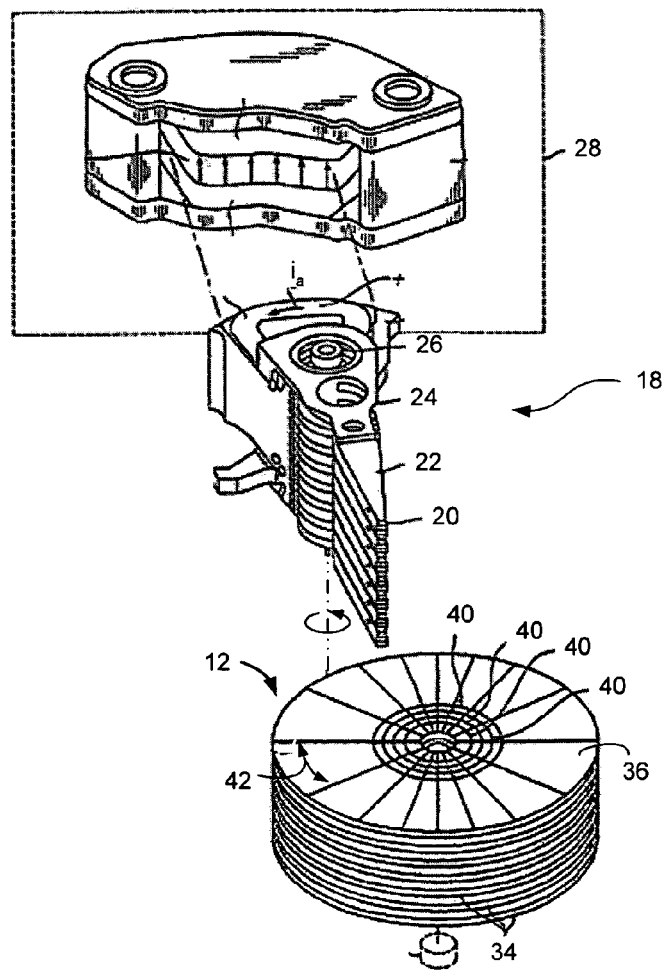
FIG. 2 is a block diagram of an exemplary head disk assembly of the disk drive.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 14.

The actuator 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 relative to their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks and spokes on the disks 34. Data is stored on the disks 34 within a number of concentric tracks 40 (or cylinders). Each track 40 is divided into a plurality of radially extending sectors 42. Each sector is further divided into a servo sector and a data sector. The servo sectors of the disks 34 are used to, among other things, accurately position the head 20 so that data can be properly written onto and read from a selected one of the disks 34. The data sectors are where non-servo related data (i.e., host device data) is stored and retrieved.

Figure 3:
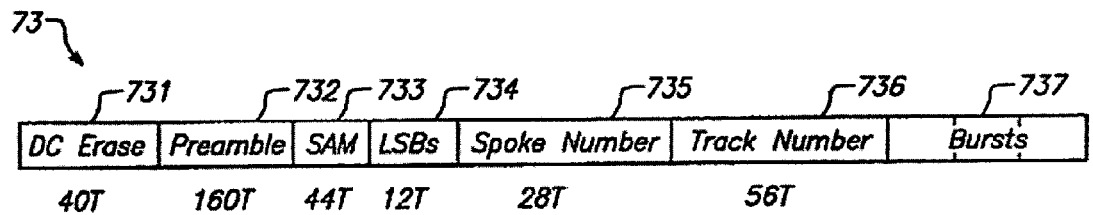
FIG. 3 is a block diagram of servo data fields in a servo sector.

FIG. 3 illustrates exemplary servo data 73 that may be stored in at least some of the servo sectors. The servo data 73 can include a DC erase field 731, a preamble field 732, a servo address mark (SAM) field 733, a track number field indicated by its least significant bits (LSBs) 734, a spoke number field 735, an entire track number field 736 which may be recorded in at least one of the servo sectors, and a servo burst field 737 of circumferentially staggered radially offset servo bursts (e.g., A, B, C, D servo bursts).

Figure 4:
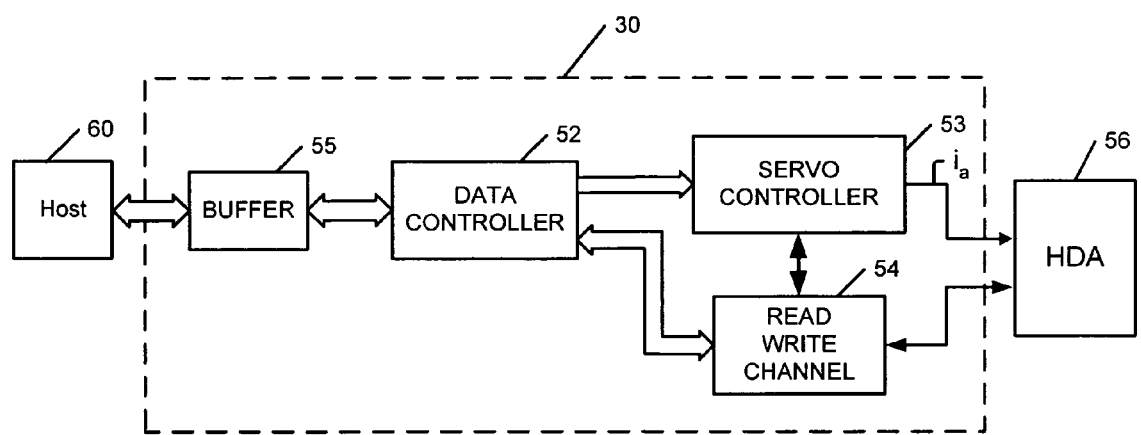
FIG. 4 is a block diagram of a portion of the controller and other electronic circuits of the disk drive shown in FIG. 1, and which are configured in accordance with some embodiments of the present invention.

FIG. 4 is a block diagram of host device 60 that is communicatively connected to a portion of the controller 30 of the disk drive 10 shown in FIG. 1 according to some embodiments. The controller 30 can include a data controller 52, a servo controller 53, a read write channel 54, and a buffer 55. Although two separate controllers 52, 53, buffer 55, and a read write channel 54 have been shown for purposes of illustration and discussion, it is to be understood that their functionality described herein may be integrated within a common integrated circuit package or distributed among more than one integrated circuit package. The head disk assembly (HDA) 56 can include a plurality of the disks 34a-b, the actuator 18 with a plurality of heads 20a-d positioned adjacent to different data storage surfaces of the disks 34a-b, the VCM 28, and the spindle motor 14.

Write commands and associated data from the host device 60 are buffered in the buffer 55. The data controller 52 is configured to carry out buffered write commands by formatting the associated data into blocks with the appropriate header information, and to transfer the formatted data from the buffer 55, via the read/write channel 54, to logical block addresses (LBAs) on the disk 34 identified by the associated write command.

The read write channel 54 can operate in a conventional manner to convert data between the digital form used by the data controller 52 and the analog form conducted through the heads 20 in the HDA 56. The read write channel 54 provides servo data read from the HDA 56 to the servo controller 53. The servo data can be used to detect the location of the head 20 in relation to LBAs on the disk 34. The servo controller 53 can use LBAs from the data controller 52 and the servo data to seek the head 20 to an addressed track and block on the disk 34, and to maintain the head 20 aligned with the track while data is written/read on the disk 34.

As explained above, it has become increasingly important to maximize disk drive data transfer rate capabilities while satisfying other constraints on disk drive operation, such as noise and/or vibration constraints. In accordance with some embodiments of the present invention, the open loop response of the disk drive 10 is measured and is used to tune the seek operation of the servo controller 53. Accordingly, the seek operations carried out by the disk drive 10 can be optimized based on the particular open loop response characteristics of the actuator 18, and may be adjusted over time to compensate for seek characteristic variations that may occur in the disk drive 10 due to, for example, mechanical wear, altitude variations, and/or power supply voltage variations. Because the whole process is very simple and straightforward with only two tuning parameters, it can be fully automated to tune the position mode seek during manufacturing or during operation with a user's host computer.

The servo controller 53 is configured to carry out a position mode seek of a selected head 20 between tracks on the corresponding disk 34 by generating the current command signal ($i_a$ of FIG. 4) to the actuator 18. The servo controller 53 varies the current command signal in response to a current feedforward signal that defines a head position profile during the seek, in response to a position response signal that defines an expected actuator movement response of the head 20 to the current feedforward signal, and in response to a current feedback signal. The servo controller 53 is further configured to measure an open loop response of the actuator 18 to an open loop test current signal, and to use the measured open loop response to vary the contributions of the current feedforward signal and the position response signal to the current command signal for the position mode seek of the head 20.

The operation of the servo controller 53 will now be described with reference to FIG. 5, which is a block diagram of the servo controller 53 shown in FIG. 4 that is configured in accordance with some embodiments of the present invention. The servo controller 53 can include a track following controller 500 and a position mode seek controller 530. The track following controller 500 is configured to control the actuator 18 using a current command signal to maintain a selected head 20 aligned with a selected track during track following mode. The position mode seek controller 530 is configured to carry out a position mode seek of the selected head 20 to a target track on the corresponding disk 34 responsive to a read/write command from the host 60.

The track following controller 500 generates a head position signal that is indicative of a radial location of the head 20, which is determined from servo data read from the disk 34. The head position signal 506 indicates a position 502 of the head 20 relative to servo data read from the disk 34 along with a noise component 504. The head position signal 506 is combined with a position response signal 532, such as via a summing node 510, and provided as a combined position signal to a feedback control unit 512. The feedback control unit 512 determines an amount of misalignment between the head 20 and a defined location along a selected track (e.g., track centerline), and generates a current feedback signal to drive the actuator 18 to move the head 20 so as to reduce the amount of misalignment (i.e., drive the head 20 toward track centerline). The current feedback signal can be inverted by an inverter 514 and filtered by a notch filter 516 to generate the illustrated current feedback signal 520. The current feedback signal 520 is combined with a current feedforward signal 534, such as via a summing node 524, to generate the current command signal 526 that controls movement of the actuator 18 to position the head 20. The current command signal 526 can include a component caused by disturbances 525 (e.g., torque disturbances).

The position mode seek controller 530 generates the current feedforward signal 534 to cause the track following controller 500 to move the actuator 18 to seek the head 20 to a target track. By varying the current feedforward signal 534, the position mode seek controller 530 can vary the magnitude of the current command signal 526 and cause the controller 500 to move the head 20. Because the track following controller 500 would sense the movement of the head 20 as a head-to-track misalignment and attempt to vary the current feedback signal 520 to drive the head 20 back on-track, the position mode seek controller 530 also generates the position response signal 532 to mask the movement of the head 20. For example, the position mode seek controller 530 can vary the position response signal 532 so that the combined signal provided to the feedback control unit 512 indicates that the head 20 is remaining substantially aligned with the selected track, while the head 20 is actually being moved during a position mode seek to a target track.

The position mode seek controller 530 measures the open loop response of the actuator 18, which is the position response of the open loop plant to the open loop test current signal. The position mode seek controller 530 further measures the position mode seek trajectories of the actuator 18 and uses the measured trajectories to vary a contribution of the position response signal 532 which is combined with the head position signal 506 to generate the signal to the feedback control unit 512, and to vary a contribution of the current feedforward signal 534 which is combined with the current feedback signal 520 to generate the current command signal 526 to the actuator 18.

Figure 5:
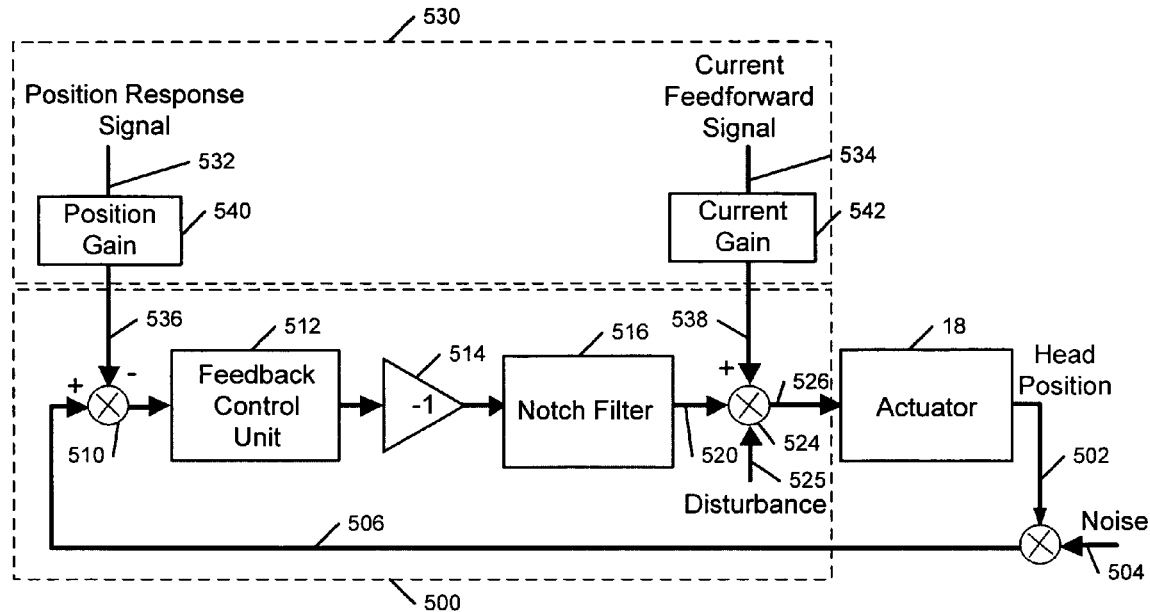
FIG. 5 is a block diagram of the servo controller shown in FIG. 4 which is configured in accordance with some embodiments of the present invention.

For example, as shown in FIG. 5, the position mode seek controller 530 can vary a position gain 540 that is applied to the position response signal 532 to generate an adjusted position response signal 536. The adjusted position response signal 536 is combined with the head position signal 506 to generate the combined signal to the feedback control unit 512. The position mode seek controller 530 can also vary a current gain 542 that is applied to the current feedforward signal 534 to generate an adjusted current feedforward signal 538. The adjusted current feedforward signal 538 is combined with the current feedback signal 520 to generate the current command signal 526.

When the position gain 540 and the current gain 542 are both unity, the head position 502 can be represented by the following Equation 1:

$$hPos=PS \cdot d-CNPS \cdot n+PS \cdot cf+CNPS \cdot p, \quad \text{(Equation 1)}$$

where hPos represents the head position 502, P represents the transfer function response of the actuator 18, S represents the sensitivity of the of the feedback control unit 512 to an input signal, C represents the transfer function response of the feedback control unit 512, d represents the disturbance (525), n represents the noise 504, p represents the position response signal 532, cf represents the current feedforward signal 534, and N represents the response of the notch filter 516.

When the position response signal 532 accurately indicates the response of the actuator 18 to the current feedforward signal 534, the closed loop response of the actuator 18 (FIG. 5) to both the current feedforward signal 534 and to the position response signal 532 is the same as the open loop response of the track following controller (FIG. 6), and can be represented by the following Equation 2:

$$hPos=PS \cdot d-CNPS \cdot n+P \cdot cf, \quad \text{(Equation 2)}$$

where the terms hPos, P, S, d, C, N, and cf are as defined above for Equation 1.

Referring to Equation 2, during position mode seek, the response of the closed feedback loop track following controller 500 (FIG. 5) to disturbances and noises can be represented by the following terms of Equation 2:

"PS·d−CNPS·n".

During position mode seek, the ideal position trajectory of actuator 18 can be represented by the following terms of Equation 2:

"P·cf".

When the position response signal 532 contains an error in its indicated response of the actuator 18 to the current feedforward signal 534, the closed loop response of the actuator 18 (FIG. 5) to both the current feedforward signal 534 and to the position response signal 532 can be represented by the following Equation 3:

$$hPos=PS \cdot d-CNPS \cdot n+P \cdot cf+CNPS \cdot \delta, \quad \text{(Equation 3)}$$

where the terms of Equation 3 have the same meaning as those defined for Equation 1, and the term δ represents the error between the response indicated by the expected position response signal 532 and the actual open loop response of the actuator 18 to the current feedforward signal.

In accordance with some embodiments of the present invention, the position mode seek controller 530 can vary the position gain 540 and the current gain 542 in response to the measured position mode seek trajectories of the actuator 18 to tune or optimize the relative effect that the position response signal 532 and the current feedforward signal 534 have on a position mode seek operation. Accordingly, the signals 532 and 534 may be optimized to reduce or eliminate the error δ in Equation 3, as well as reduce the seek time, improve the settle transient. As will be discussed further below, the open loop response of the actuator 18 can be measured, and the position gain 540 and the current gain 542 can be iteratively varied until the measured position mode seek trajectories satisfy at least one or more threshold values.

Figure 6:
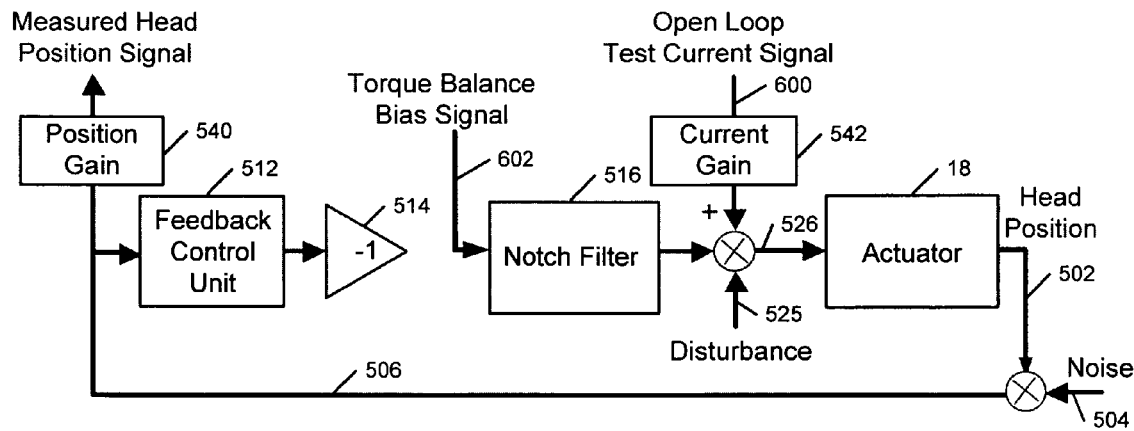
FIG. 6 is a block diagram of the servo controller shown in FIG. 4 which is configured to measure open loop response of the actuator in accordance with some embodiments of the present invention.

FIG. 6 is a block diagram of the track following controller 500 shown in FIG. 5 which is configured to measure open loop response of the actuator 18 in accordance with some embodiments of the present invention. To measure the open loop response of the actuator 18, the feedback control loop is opened by cutting-off (disabling) the current feedback signal from the feedback control unit 512 so that it does not contribute to the current command signal 526. The current command signal 526 is instead varied in response to an open loop test current signal 600 and a torque balance bias signal 602, both of which may be generated by the position mode seek controller.

The torque balance bias signal 602 is generated to bias the current command signal 526 so as to cause the actuator 18 to generate a bias force that offsets a torque disturbance force against the head 20 while the open loop response of the actuator 18 is measured. The torque balance bias signal 602 may be passed through the notch filter 516 to provide a constant amplitude signal which is combined with the open loop test current signal 600 to generate the current command signal 526 to the actuator 18.

The open loop test current signal 600 is generated with known characteristics in an attempt to cause the actuator 18 to move the head 20 an expected radial distance. The actual response of the actuator 18 to the open loop test current signal 600 is determined by measuring the radial distance that the head 20 has moved. For example, the a first radial location of the head 20 can be determined based on read servo data, the open loop test current signal 600 can be generated to vary the current command signal 526, and a second radial location of the head 20 can again be determined based on read servo data. The distance that the head 20 has moved in response to the open loop test current signal 600 can be used to determine the open loop response of the actuator 18.

Accordingly, the measured head position signal 506 is the open loop response of the actuator 18 to the torque balance bias signal 602, the open loop test current signal 600, noise 504, and disturbances 525, and can be represented by the following Equation 4:

$$hPos=P \cdot d+P \cdot cf-NP \cdot b+n, \quad \text{(Equation 4)}$$

where the terms P, d, cf, N, and n have the same meanings as defined for Equation 1, and the term b represents the torque balance bias signal 602. In ideal case, the torque balance bias signal 602 balances the DC portion of the torque disturbance "d(0)", notch filter won't affect the DC torque balance bias signal 602, the head position can be represented by the following equation 5:

$$hPos=P \cdot (d-d(0))+n+P \cdot cf. \quad \text{(Equation 5)}$$

The open loop test current signal 600 may be a sinusoidal signal having a defined duration. For example, the open loop test current signal 600 may be generated as a sinusoidal signal having an amplitude, wavelength, and/or duration characteristics that are defined based on an expected minimum jerk open loop response of the actuator 18 to that signal. When the closed loop response of the track following controller 500 can be represented by a double integrator model and carries out a position mode seek operation that moves the head 20 across a seek distance d over a time period T, the open loop test current signal 600 may be defined as a minimal jerk signal represented by the following Equation 6:

$$Signal_{\text{min\_jerk}} = 60 \frac{d}{T^2} \left[ 2\left(\frac{t}{T}\right)^3 - 3\left(\frac{t}{T}\right)^2 + \frac{t}{T} \right].$$ (Equation 6)

Figure 7:
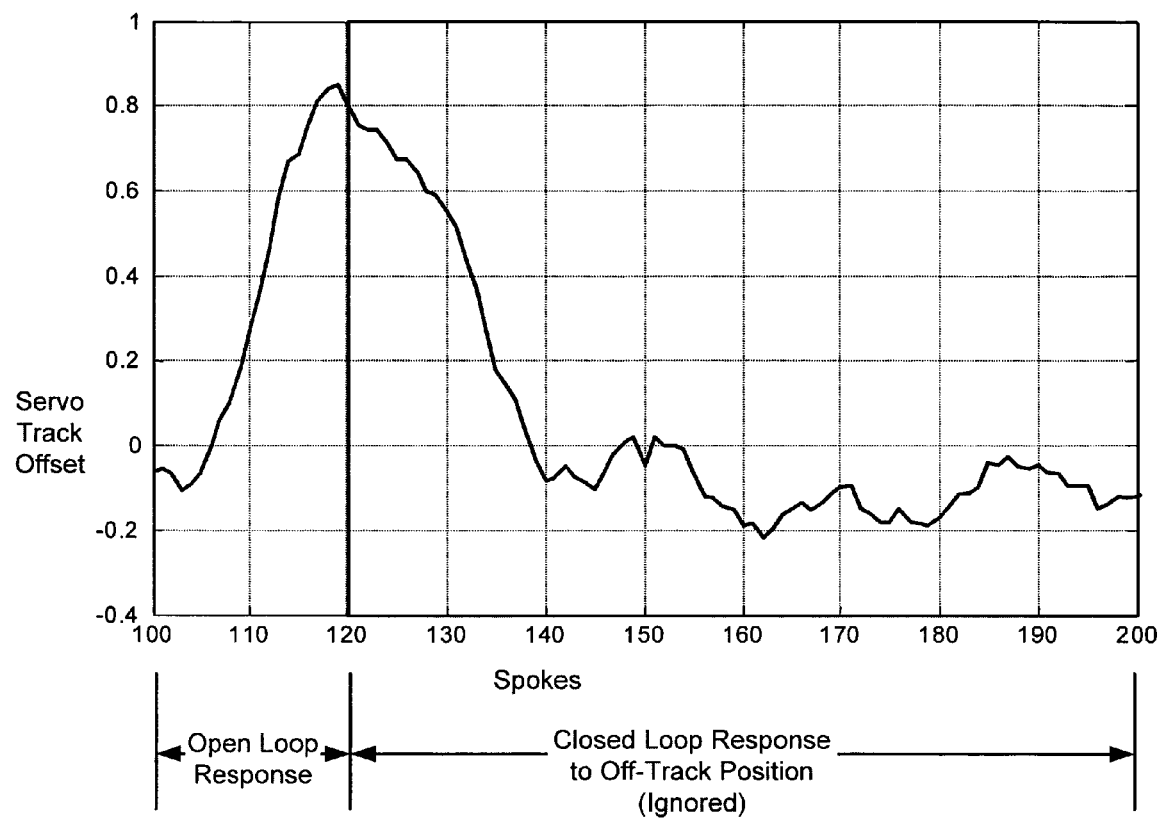
FIG. 7 illustrates a graph of the open loop response of the actuator to an exemplary open loop test current signal.

FIG. 7 illustrates a graph of the open loop response of the actuator 18 to an exemplary open loop test current signal 600. With reference to FIG. 7, the control loop of the track following controller 500 is opened as shown in FIG. 6 during servo spoke times 100-120, and the open loop test current signal 600 is applied to cause the actuator 18 to move the head 20. The head 20 is determined to have moved from a servo track offset position of about −0.1 to about 0.85. Accordingly, the open loop response of the actuator 18 to the open loop test current signal 600 is measured based on the head 20 moving about 0.95 servo tracks over about 20 servo spokes. The control loop of the track following controller 500 is subsequently closed, forming the feedback loop shown in FIG. 5, to move the head 20 back toward a track centerline. The measurements from a plurality of the open loop response tests may be averaged to determine a typical open loop response for the actuator 18.

Figure 8:
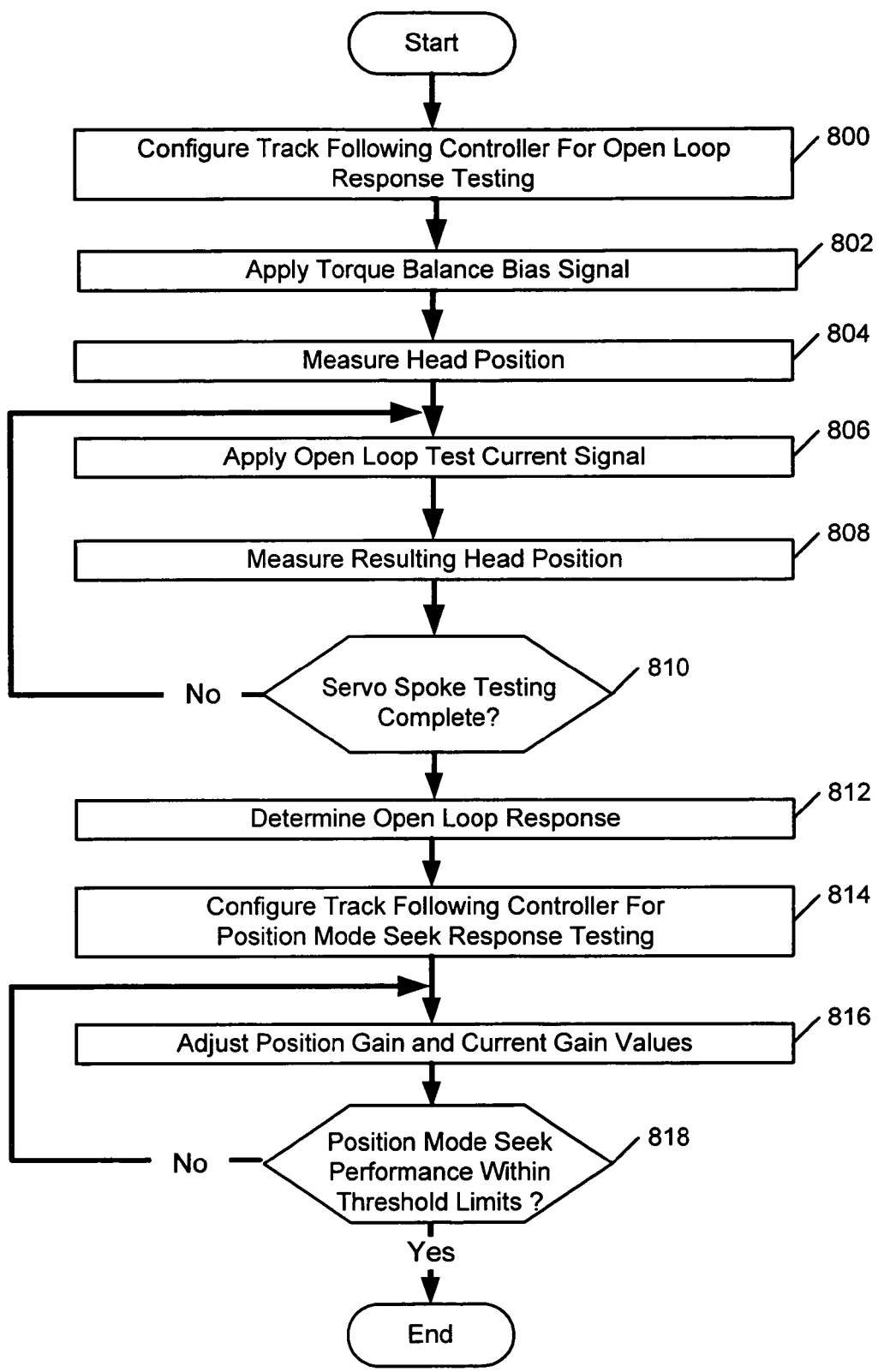
FIG. 8 is a flowchart showing operations for tuning the position mode seek.

FIG. 8 is a flowchart showing operations for measuring the open loop response of the actuator 18 of FIG. 5, and for tuning the values of the position gain 540 and the current gain 542. At Block 800, the track following controller 500 is configured for open loop testing by disabling the current feedback signal 520, for example, as illustrated in FIG. 6. At Block 802, the torque balance bias signal 602 is applied to balance the head 20 against torque disturbances. At Block 804, the radial position of the head 20 is measured. At Block 806, the open loop test current signal 600 is applied. Accordingly, the current command signal 526 provided to control the actuator 18 includes a component from the torque balance bias signal 602 and from the open loop test current signal 600. At Block 808, the resulting radial position of the head 20 is measured. A decision is made at block 810 as to whether the open loop response testing has been completed on a defined number of servo spokes, which in example of FIG. 7 is 20 spokes. When the open loop response testing has not completed, the operations loop back to Block 806. After completing testing across the defined number of servo spokes, the open loop response of the actuator 18 is determined, at Block 812, based on the applied open loop test current signal 600 and the measured change in the radial position of the head 20. At Block 814, the track following controller 500 is configured for configured for popsition mode seek testing by re-enabling the current feedback signal 520, for example, as illustrated in FIG. 5. At Block 816, the position gain 540 and the current gain 542 values are varied, and the performance of the position mode seek using the current feedforward signal 534 and position response signal 532 injected to the closed loop of the track following controller 500 is tested/observed. A determination is made at Block 818 as to whether the position mode seek performance satisfies at least one or more threshold value and, when it does not, the position gain value and/or the current gain value can be again adjusted (Block 816). Accordingly, the position gain 540 and the current gain 542 can be iteratively tuned, such as through a grid-search and/or gradient based search methodologies, until the resulting position mode seek performance satisfies one or more threshold values. Although various exemplary embodiments have been discussed in the context of iterating the position and current gain values until the position mode seek performance satisfies one or more threshold values, it is to be understood that is some other embodiments the iterations may continue until optimum position and current gain values are identified.

The servo controller 53 may carry out the open loop response test and tuning of the position gain and current gain as part of the manufacturing processes for the disk drive 10, and/or after the disk drive 10 has been sold to an end-user. For example, the open loop response testing and tuning of the position gain and current gain may be carried out as part of a self-test process upon power-up of the disk drive 10 and/or receipt of a shut-down command from the host device 60. Accordingly, the seek operations carried out by the disk drive 10 can be optimized to compensate for seek characteristic variations that may occur in the disk drive 10 due to, for example, mechanical wear, altitude variations, and/or power supply voltage variations. Moreover, by measuring the open loop response of the actuator 18 upon power-up and/or or receipt of a shut-down command, the associated measurement and gain value tuning process may be carried out with a negligible or no effect on the performance of the disk drive 10 as perceived by the host device 60.

For example, by carrying out measurement and gain value tuning process during a time period between when the disk drive 10 is powered-up and when it signals to the host device 60 that it is ready to receive read/write commands therefrom, the disk drive 10 can compensate for a change in change in characteristics without interfering with the subsequent response performance of the disk drive 10 to read/write commands from the host device 60. Some host computer operating systems allow a disk drive up to about 30 seconds after powering-up to signal that it is ready to receive read/write commands from the host computer, after which time the absence of a ready signal may be interpreted by the host computer as a disk drive error. Accordingly, the disk drive 10 may measure open loop response of the actuator 18 and iteratively tune the position gain and current gain during the power-up response time window so as to be transparent to the host computer.

In addition, the current gain 542 and position gain 540 can be the parameters of real time adaptation. Periodically, when initiating a position mode seek, the gains are varied around current gain values to find the gain direction for performance improvement. If new gain values are found which improves the position mode seek performance, these become the current gain values and the process continues on.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A disk drive comprising:
a rotatable data storage disk;
a head that is configured to read data from the disk;
an actuator that is configured to position the head relative to the disk responsive to a current command signal; and
a servo controller that is configured to carry out a position mode seek of the head between tracks on the disk by generating the current command signal to the actuator which is varied in response to a current feedforward signal that defines a head position profile during the seek, varied in response to a position response signal that defines an expected actuator movement response of the head to the current feedforward signal, and varied in response to a current feedback signal, the servo controller is further configured to measure an open loop response of the actuator to an open loop test current signal, and is configured to use the measured open loop response of the actuator to vary contributions of the current feedforward signal and the position response signal to the current command signal for the position mode seek of the head.

2. The disk drive of claim 1, wherein the servo controller is further configured to apply a first variable gain to the current feedforward signal to generate an adjusted current feedforward signal which is combined with a head position signal to generate the current feedback signal, to apply a second variable gain to the position response signal to generate an adjusted position response signal which is combined with the current feedback signal to generate the current command signal to the actuator, and to vary the first variable gain and the second variable gain in response to measured position mode seek trajectories of the actuator.

3. The disk drive of claim 2, wherein the servo controller is further configured to iteratively vary the first and second variable gains until a measured performance of the position mode seeks of the actuator satisfies one or more threshold values.

4. The disk drive of claim 1, wherein:
the servo controller comprises a position mode seek controller and a track following controller;
the track following controller is configured to respond to a head position signal that is indicative of a radial location of the head, which is determined from servo data read from the disk, and is configured to generate the current feedback signal to drive the actuator to move the head in a direction that reduces radial distance between the indicated radial location of the head and a defined position along a target track on the disk; and
the position mode seek controller is configured to combine the position response signal with the head position signal to generate a combined signal from which the current feedback signal is generated, and to combine the current feedforward signal with the current feedback signal to generate the current command signal to the actuator.

5. The disk drive of claim 4, wherein the position mode seek controller is further configured to use measured position mode seek performance of the actuator to vary a contribution of the position response signal to the combined signal and to vary a contribution of the current feedforward signal to the current command signal.

6. The disk drive of claim 5, wherein the position mode seek controller is configured to optimize the contribution of the position response signal to the combined signal and the contribution of the current feedforward signal to the current command signal through an automated process without receiving input from a human operator.

7. The disk drive of claim 5, wherein the position mode seek controller is configured to adjust the contribution of the position response signal to the combined signal and the contribution of the current feedforward signal to the current command signal while carrying out a position mode seek so as to observe the real-time effect of the adjustments on position mode seek performance.

8. The disk drive of claim 5, wherein the position mode seek controller is further configured to iteratively vary the contribution of the position response signal to the combined signal and to iteratively vary the contribution of the current feedforward signal to the current command signal until the position mode seek performance of the actuator satisfies one or more threshold value.

9. The disk drive of claim 4, wherein the position mode seek controller varies the position response signal so that the combined signal of the position response signal and the head position signal indicates that that the head is remaining substantially aligned with the selected track while the head is moved during a position mode seek to a target track.

10. The disk drive of claim 9, wherein the position mode seek controller is further configured to vary the current feedforward signal and the position response signal according to a profile which is selected in response to a radial distance that the head is to be moved during the position mode seek to the target track.

11. The disk drive of claim 1, wherein the servo controller is further configured to measure the open loop response of the actuator by varying the current command signal to the actuator in response to the open loop test current signal, and by measuring radial change in position of the head in response to the open loop test current signal.

12. The disk drive of claim 11, wherein the servo controller is further configured to measure the open loop response of the actuator by varying the current command signal to the actuator in response to the open loop test current signal while preventing the current feedback signal from contributing to the variation of the current command signal, and by measuring the radial change in position of the head in response to the open loop test current signal.

13. The disk drive of claim 1, wherein the servo controller is further configured to bias the open loop test current signal with a torque balance signal that causes the actuator to generate a bias force that offsets a torque disturbance force against the head while the servo controller measurers the open loop response of the actuator.

14. The disk drive of claim 13, wherein the servo controller is further configured to add the torque balance signal as a constant amplitude signal to the open loop test current signal while the servo controller measures the open loop response of the actuator.

15. The disk drive of claim 1, wherein the servo controller is further configured to generate the open loop test current signal as a sinusoidal signal having a defined duration.

16. The disk drive of claim 15, wherein the servo controller generates the sinusoidal signal of the open loop test current signal with amplitude and duration characteristics that are defined based on an expected minimum jerk open loop response of the actuator to the sinusoidal signal.

17. A method of controlling an actuator to position a read head relative to a rotatable data storage disk in a disk drive, the method comprising:
measuring an open loop response of the actuator to an open loop test current signal;
carrying out a position mode seek of the head between tracks on the disk by generating a current command signal to the actuator which is varied in response to a current feedforward signal that defines a head position profile during the seek, varied in response to a position response signal that defines an expected actuator movement response of the head to the current feedforward signal, and varied in response to a current feedback signal; and
varying contributions of the current feedforward signal and the position response signal to the current command signal for the position mode seek of the head in response to the measured open loop response of the actuator.

18. The method of claim 17, wherein varying contributions of the current feedforward signal and the position response signal to the current command signal for the position mode seek of the head in response to the measured position mode seek performance of the actuator comprises:

applying a first variable gain to the current feedforward signal to generate an adjusted current feedforward signal which is combined with a head position signal to generate the current feedback signal;

applying a second variable gain to the position response signal to generate an adjusted position response signal which is combined with the current feedback signal to generate the current command signal to the actuator; and varying the first variable gain and the second variable gain in response to measured position mode seek trajectories of the actuator.

19. The method of claim 18, further comprising iteratively varying the first and second variable gains until the performance of the open loop seeks of the actuator satisfies one or more threshold values.

20. The method of claim 17, wherein measuring an open loop response of the actuator to an open loop test current signal comprises:

varying the current command signal to the actuator in response to the open loop test current signal; and measuring radial change in position of the head in response to the open loop test current signal.

21. The method of claim 20, wherein during the measurement of the open loop response of the actuator, the current command signal to the actuator is varied in response to the open loop test current signal while preventing the current feedback signal from contributing to the variation of the current command signal.

22. The method of claim 17, wherein during the measurement of the open loop response of the actuator, the open loop test current signal is biased with a torque balance signal that causes the actuator to generate a bias force that offsets a torque disturbance force against the head.

23. The method of claim 22, wherein during the measurement of the open loop response of the actuator, the torque balance signal is added as a constant amplitude signal to the open loop test current signal.

24. The method of claim 17, wherein the open loop response of the actuator is measured in response to the open loop test current signal configured as a sinusoidal signal having a defined duration.

* * * * *